US012561830B2

(12) United States Patent
Tian et al.

(10) Patent No.: US 12,561,830 B2
(45) Date of Patent: Feb. 24, 2026

(54) NEURAL IMPLICIT SCATTERING FUNCTIONS FOR INVERSE PARAMETER ESTIMATION AND DYNAMICS MODELING OF MULTI-OBJECT INTERACTIONS

(71) Applicants: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(72) Inventors: Stephen Tian, Stanford, CA (US); Yancheng Cai, Cambridge (GB); Hong-Xing Yu, Stanford, CA (US); Sergey Zakharov, Stanford, CA (US); Katherine Liu, Mountain View, CA (US); Adrien David Gaidon, Mountain View, CA (US); Yunzhu Li, Stanford, CA (US); Jiajun Wu, Stanford, CA (US)

(73) Assignees: TOYOTA RESEARCH INSTITUTE, INC., Los Altos, CA (US); TOYOTA JIDOSSHA KABUSHIKI KAISHA, Aichi-Ken (JP); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 278 days.

(21) Appl. No.: 18/539,157

(22) Filed: Dec. 13, 2023

(65) Prior Publication Data

US 2024/0249426 A1      Jul. 25, 2024

Related U.S. Application Data

(60) Provisional application No. 63/440,971, filed on Jan. 25, 2023.

(51) Int. Cl.
  *G06K 9/00* (2022.01)
  *B25J 9/16* (2006.01)
  (Continued)

(52) U.S. Cl.
  CPC ............... *G06T 7/70* (2017.01); *B25J 9/1697* (2013.01); *G06V 10/60* (2022.01); *G06F 16/95* (2019.01);
  (Continued)

(58) Field of Classification Search
  CPC ........ B25J 9/1697; G06F 16/95; G06V 10/60; G06T 2207/10016; G06T 2207/20081; G06T 2207/20084; G06T 7/70
  See application file for complete search history.

(56) References Cited

U.S. PATENT DOCUMENTS

2018/0253869 A1*  9/2018  Yumer .................... G06T 11/60
2021/0133990 A1*  5/2021  Eckart ................. G06F 18/2321
  (Continued)

OTHER PUBLICATIONS

Guo, Michelle, et al. "Object-centric neural scene rendering." arXiv preprint arXiv:2012.08503 (2020). (Year: 2020).*
  (Continued)

*Primary Examiner* — Hadi Akhavannik
(74) *Attorney, Agent, or Firm* — SEYFARTH SHAW LLP

(57)  ABSTRACT

A method for dynamic modeling and manipulation of multi-object scenes is described. The method includes using object-centric neural implicit scattering functions (OSFs) as object representations in a model-predictive control (MPC) framework for the multi-object scenes. The method also includes modeling a per-object light transport to enable compositional scene re-rendering under object rearrangement and varying lighting conditions. The method further includes applying inverse parameter estimation and graph neural network (GNN) dynamics models to estimate initial
  (Continued)

object poses and a light position in the multi-object scene. The method also includes manipulating an object perceived in the multi-object scene according to the applying of the inverse parameter estimation and the GNN dynamics models.

20 Claims, 9 Drawing Sheets

(51) Int. Cl.
    *G06T 7/70*          (2017.01)
    *G06V 10/60*      (2022.01)
    *G06F 16/95*      (2019.01)

(52) U.S. Cl.
    CPC .............. *G06T 2207/10016* (2013.01); *G06T 2207/20081* (2013.01); *G06T 2207/20084* (2013.01)

(56)                   References Cited

U.S. PATENT DOCUMENTS

| | | | |
|---|---|---|---|
| 2022/0076432 A1* | 3/2022 | Ramezani | G01S 17/931 |
| 2022/0076447 A1* | 3/2022 | He | G06V 20/64 |
| 2022/0126445 A1* | 4/2022 | Zhu | G06N 3/08 |
| 2024/0153101 A1* | 5/2024 | Ye | G06V 20/70 |

OTHER PUBLICATIONS

Driess, Danny, et al. "Learning multi-object dynamics with compositional neural radiance fields." Conference on robot learning. PMLR, 2023. (Year: 2023).*

Driess, Danny, et al., "Learning Multi-Object Dynamics with Compositional Neural Radiance Fields," arXiv:2202.11855v3 [cs.CV] Jul. 27, 2022.

\* cited by examiner

$D_{1:n}^{node}$

Node Decoder
for all objects

730

$p_{1:n}^{node}$

Node Propagator

Loop multiple steps
to solve multi-object
interaction

740

$p^{edge}$

Edge Propagator

710 action
$a^t$ $E_{1:n}^{node}$

Node Encoder
for all objects $S_{1:n}^t$

720

$E^{edge}$

Edge Encoder $A^t$

700

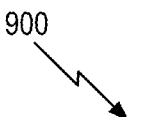

900

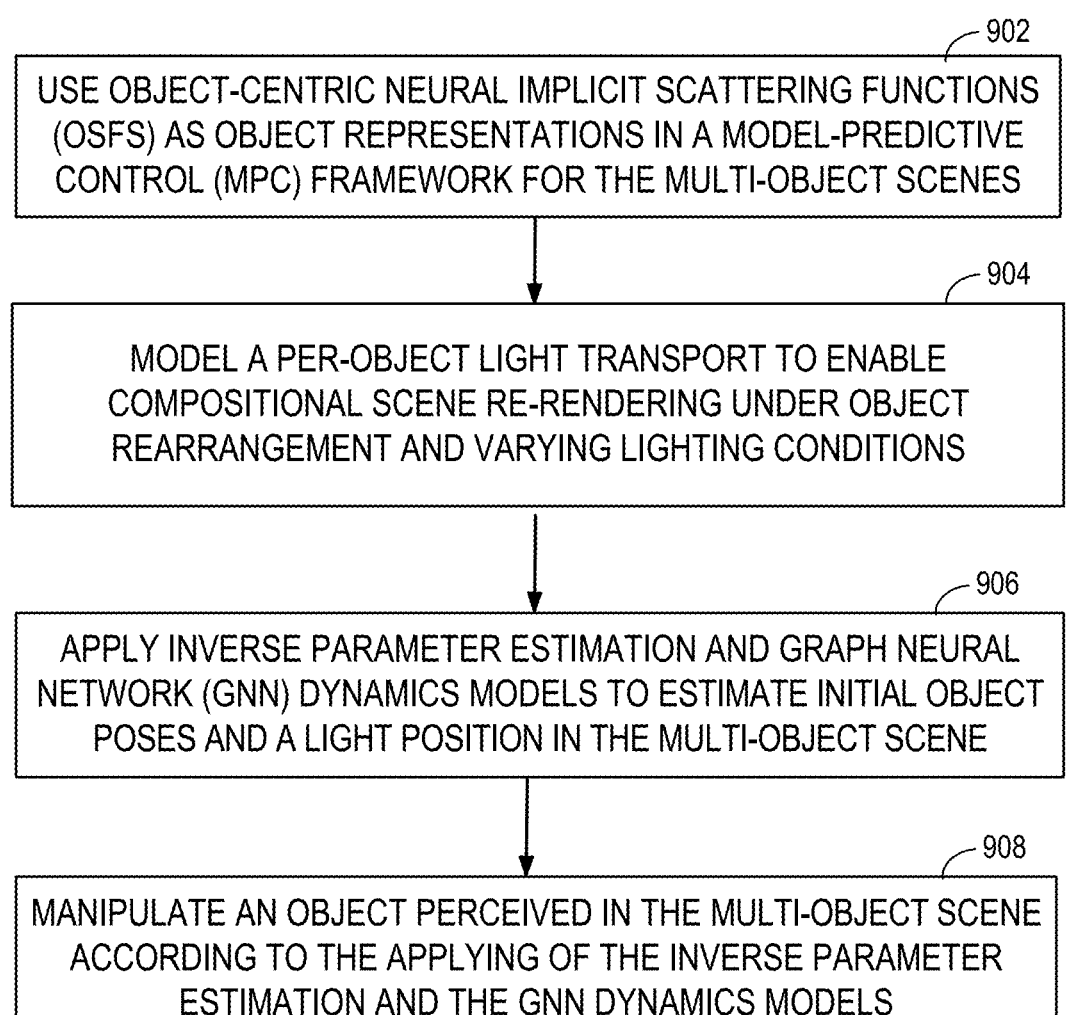

902

USE OBJECT-CENTRIC NEURAL IMPLICIT SCATTERING FUNCTIONS (OSFS) AS OBJECT REPRESENTATIONS IN A MODEL-PREDICTIVE CONTROL (MPC) FRAMEWORK FOR THE MULTI-OBJECT SCENES

904

MODEL A PER-OBJECT LIGHT TRANSPORT TO ENABLE COMPOSITIONAL SCENE RE-RENDERING UNDER OBJECT REARRANGEMENT AND VARYING LIGHTING CONDITIONS

906

APPLY INVERSE PARAMETER ESTIMATION AND GRAPH NEURAL NETWORK (GNN) DYNAMICS MODELS TO ESTIMATE INITIAL OBJECT POSES AND A LIGHT POSITION IN THE MULTI-OBJECT SCENE

908

MANIPULATE AN OBJECT PERCEIVED IN THE MULTI-OBJECT SCENE ACCORDING TO THE APPLYING OF THE INVERSE PARAMETER ESTIMATION AND THE GNN DYNAMICS MODELS

*FIG. 9*

NEURAL IMPLICIT SCATTERING FUNCTIONS FOR INVERSE PARAMETER ESTIMATION AND DYNAMICS MODELING OF MULTI-OBJECT INTERACTIONS

CROSS-REFERENCE TO RELATED APPLICATION

The present application claims the benefit of U.S. Provisional Patent Application No. 63/440,971, filed Jan. 25, 2023, and titled "NEURAL IMPLICIT SCATTERING FUNCTIONS FOR INVERSE PARAMETER ESTIMATION AND DYNAMICS MODELING OF MULTI-OBJECT INTERACTIONS," the disclosure of which is expressly incorporated by reference herein in its entirety.

GOVERNMENT SUPPORT CLAUSE STATEMENT

The invention was made with Government support under contract FA9550-23-1-0127 awarded by the Air Force Office of Scientific Research, under contract 2211258 awarded by the National Science Foundation, and under contract N00014-22-1-2740 awarded by the Office of Naval Research. The Government has certain rights in the invention.

BACKGROUND

Field

Certain aspects of the present disclosure relate to machine learning and, more particularly, neural implicit scattering functions for inverse parameter estimation and dynamics modeling of multi-object interactions.

Background

Autonomous agents (e.g., robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

Learning visual dynamics models of the environment has been shown to be effective in downstream robotic manipulation tasks. Yet, it remains unclear how best to represent scenes involving multi-object interactions. One idea is to decompose a scene into discrete objects; however, existing methods leverage object representations that only encode an object's appearance under specific conditions, which struggle with precise modeling and manipulation of compositional scenes in the face of extreme lighting conditions. Object-centric neural implicit scattering functions for providing object representations in a model-predictive control framework to enable compositional scene re-rendering under object rearrangement and varying lighting conditions is desired.

SUMMARY

A method for dynamic modeling and manipulation of multi-object scenes is described. The method includes using object-centric neural implicit scattering functions (OSFs) as object representations in a model-predictive control (MPC) framework for the multi-object scenes. The method also includes modeling a per-object light transport to enable compositional scene re-rendering under object rearrangement and varying lighting conditions. The method further includes applying inverse parameter estimation and graph neural network (GNN) dynamics models to estimate initial object poses and a light position in the multi-object scene. The method also includes manipulating an object perceived in the multi-object scene according to the applying of the inverse parameter estimation and the GNN dynamics models.

A non-transitory computer-readable medium having program code recorded thereon for dynamic modeling and manipulation of multi-object scenes is described. The program code is executed by a processor. The non-transitory computer-readable medium includes program code to use object-centric neural implicit scattering functions (OSFs) as object representations in a model-predictive control (MPC) framework for the multi-object scenes. The non-transitory computer-readable medium also includes program code to model a per-object light transport to enable compositional scene re-rendering under object rearrangement and varying lighting conditions. The non-transitory computer-readable medium further includes program code to apply inverse parameter estimation and graph neural network (GNN) dynamics models to estimate initial object poses and a light position in the multi-object scene. The non-transitory computer-readable medium also includes program code to manipulate an object perceived in the multi-object scene according to the applying of the inverse parameter estimation and the GNN dynamics models.

A system for dynamic modeling and manipulation of multi-object scenes is described. The system includes a framework module to use object-centric neural implicit scattering functions (OSFs) as object representations in a model-predictive control (MPC) framework for the multi-object scenes. The system also includes a per object light transfer model to model a per-object light transport to enable compositional scene re-rendering under object rearrangement and varying lighting conditions. The system further includes a graph-based neural dynamics model to apply inverse parameter estimation and graph neural network (GNN) dynamics models to estimate initial object poses and a light position in the multi-object scene. The system also includes an object manipulation module to manipulate an object perceived in the multi-object scene according to the applying of the inverse parameter estimation and the GNN dynamics models.

This has outlined, broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 is a block diagram of a covariance matrix adaptation (CMA) optimizer for pose estimation of various objects and light, according to aspects of the present disclosure.

FIG. 9 is a flowchart illustrating a method for dynamic modeling and manipulation of multi-object scenes, according to aspects of the present disclosure.

DETAILED DESCRIPTION

Figure 1:
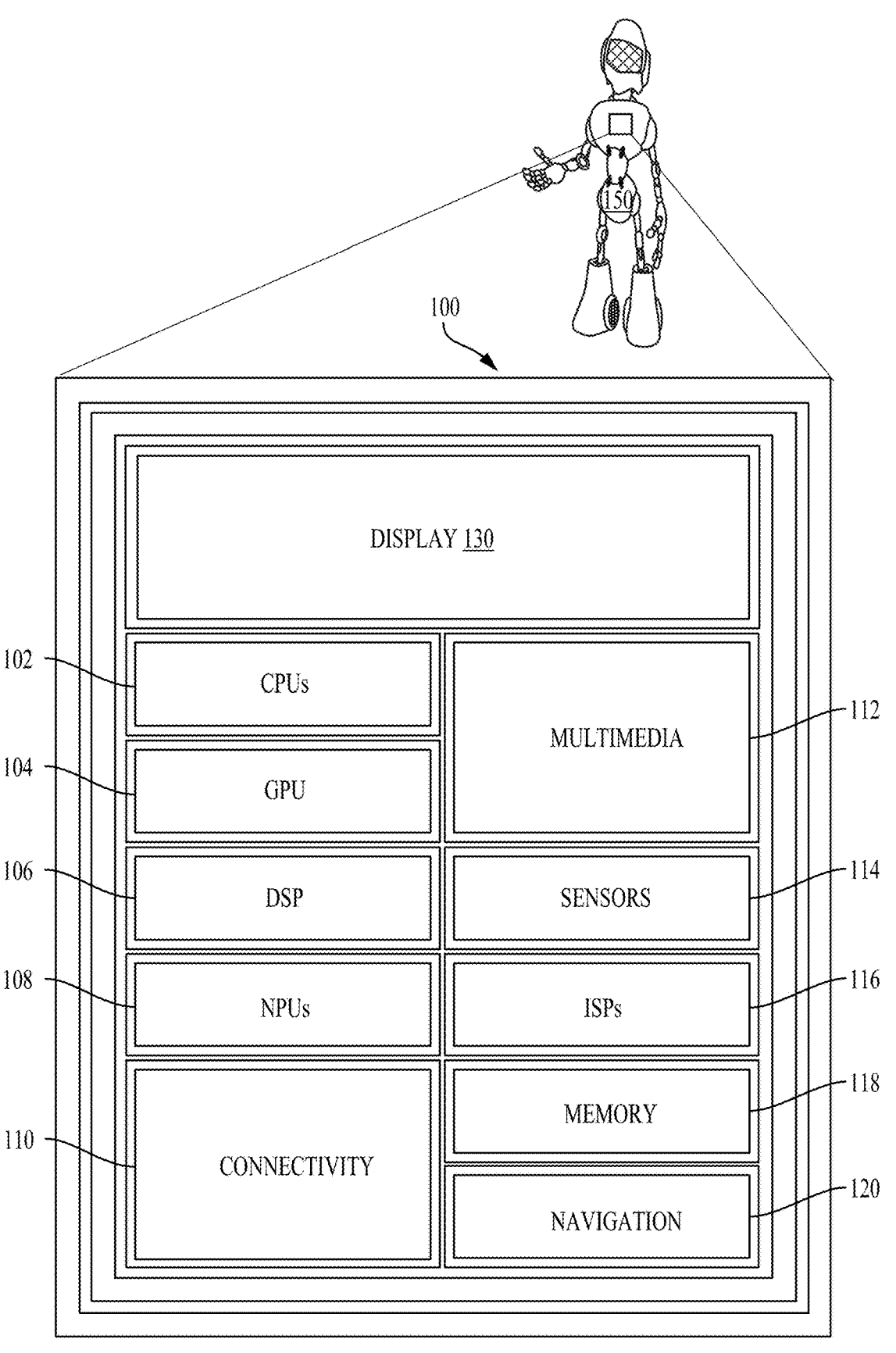
FIG. 1 illustrates an example implementation of designing a system using a system-on-a-chip (SOC) for 3D object representation using object-centric neural implicit scattering functions (OSF) in a model-predictive control (MPC) framework, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Learning visual dynamics models of the environment has been shown as an effective to support downstream robotic manipulation tasks, such as an object grasp. Yet, it remains unclear how best to represent scenes involving multi-object interactions. One idea is to decompose a scene into discrete objects; however, existing methods leverage object representations that only encode an object's appearance under specific conditions, which struggle with precise modeling and manipulation of compositional scenes in the face of extreme lighting conditions.

Predictive models are the core components of many robotic systems for solving inverse problems such as planning and control. Physics-based models built on first principles have shown impressive performance in domains such as drone navigation and robot locomotion. Nevertheless, such methods usually rely on complete a priori knowledge of the environment, limiting their use in complicated manipulation problems where full-state estimation is complex and often impossible. Therefore, a growing number of approaches alternatively propose to learn dynamics models directly from raw visual observations.

Although using raw sensor measurements as inputs to predictive models is an attractive paradigm as they are readily available, visual data can be challenging to work with directly due to its high dimensionality. Conventional methods propose learning dynamics models over latent vectors, which demonstrate promising results in a range of robotic tasks. Nevertheless, with multi-object interactions, the underlying physical world is 3D and compositional. Encoding everything into a single latent vector fails to consider the relational structure within the environment, limiting its generalization outside the training distribution.

Another promising strategy builds more structured visual representations of the environment, including the use of particles, keypoints, and object meshes. Among the structured representations, one conventional strategy leveraged compositional neural implicit representations in combination with graph neural networks (GNNs) for the dynamic modeling of multi-object interactions. The inductive bias introduced by GNNs captures the environment's underlying structure, enabling generalization to scenarios containing more objects than during training, and the neural implicit representations allow precise estimation and modeling of object geometry and interactions. Nevertheless, conventional strategy only considered objects of uniform color in well-lit scenarios. It is unclear how the method works for objects with more complicated geometries and textures. The lack of explicit modeling of light transport also limits its use in scenarios of varying lighting conditions, especially those vastly different from the training distributions.

Various aspects of the present disclosure propose to combine object-centric neural implicit scattering functions (OSFs) and graph neural networks for the dynamic modeling and manipulation of multi-object scenes. In various aspects of the present disclosure, OSFs are utilized for explicitly modeling light transport and learning to approximate the cumulative radiance transfer, which allows relighting and inverse estimation of scenes involving multiple objects and the change of lights. Combined with gradient-free evolution algorithms like covariance matrix adaptation (CMA), the learned neural implicit scattering functions support inverse parameter estimation, including object poses and light directions, from visual observations. Based on the estimated scene parameters, a graph-based neural dynamics model considers the interactions between objects and predicts the evolution of the underlying system. In various aspects of the present disclosure, the predictive model is used within a model-predictive control (MPC) framework for downstream manipulation tasks.

Experiments demonstrate that the method for dynamic modeling and manipulation of multi-object scenes performs more accurate reconstruction in harsh lighting conditions compared to prior methods, producing higher-fidelity long horizon prediction compared to video prediction models. When combined with inverse parameter estimation, an entire control pipeline based on OSFs and graph neural networks improves simulated object manipulation tasks in settings with varying lighting and previously unseen object configurations, relative to performing MPC directly in image space.

Various aspects of the present disclosure utilize object-centric neural implicit scattering functions (OSFs) for explicitly modeling light transport and learning to approximate the cumulative radiance transfer, which allows relighting and inverse estimation of scenes involving multiple objects and the change of lights. Additionally, the disclosed method for dynamic modeling and manipulation of multi-object scenes models the compositionality of the underlying scene and can make long-term future predictions about the system's evolution to support downstream planning tasks. This proposed method for dynamic modeling and manipulation of multi-object scenes exhibits successful manipulation of simulated multi-object scenes involving extreme lighting directions.

FIG. 1 illustrates an example implementation of the aforementioned system and method for 3D object representation using object-centric neural implicit scattering functions (OSF) in a model-predictive control (MPC) framework using a system-on-a-chip (SOC) 100 of a robot 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a robot. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the robot 150. In this arrangement, the robot 150 may include a processor and other features of the SOC 100. In this aspect of the present disclosure, instructions loaded into a processor (e.g., CPU 102) or the NPU 108 of the robot 150 may include code for dynamic modeling and manipulation of multi-object scenes within an image captured by the sensor processor 114. The instructions loaded into a processor (e.g., CPU 102) may also include code for planning and control (e.g., of the robot 150) in response to dynamic modeling and manipulation of multi-object scenes from images captured by the sensor processor 114.

The instructions loaded into a processor (e.g., CPU 102) may also include code to use object-centric neural implicit scattering functions (OSFs) as object representations in an MPC framework for the multi-object scenes. The instructions loaded into a processor (e.g., CPU 102) may also include code to model a per-object light transport to enable compositional scene re-rendering under object rearrangement and varying lighting conditions. The instructions loaded into a processor (e.g., CPU 102) may further include code to apply inverse parameter estimation and graph-based neural dynamics models for estimating initial object poses and a light position in a multi-object scene. The instructions loaded into a processor (e.g., CPU 102) may also include code to manipulate an unknown object perceived in the multi-object scene according to the code to apply the inverse parameter estimation and the graph-based neural dynamics models.

Figure 2:
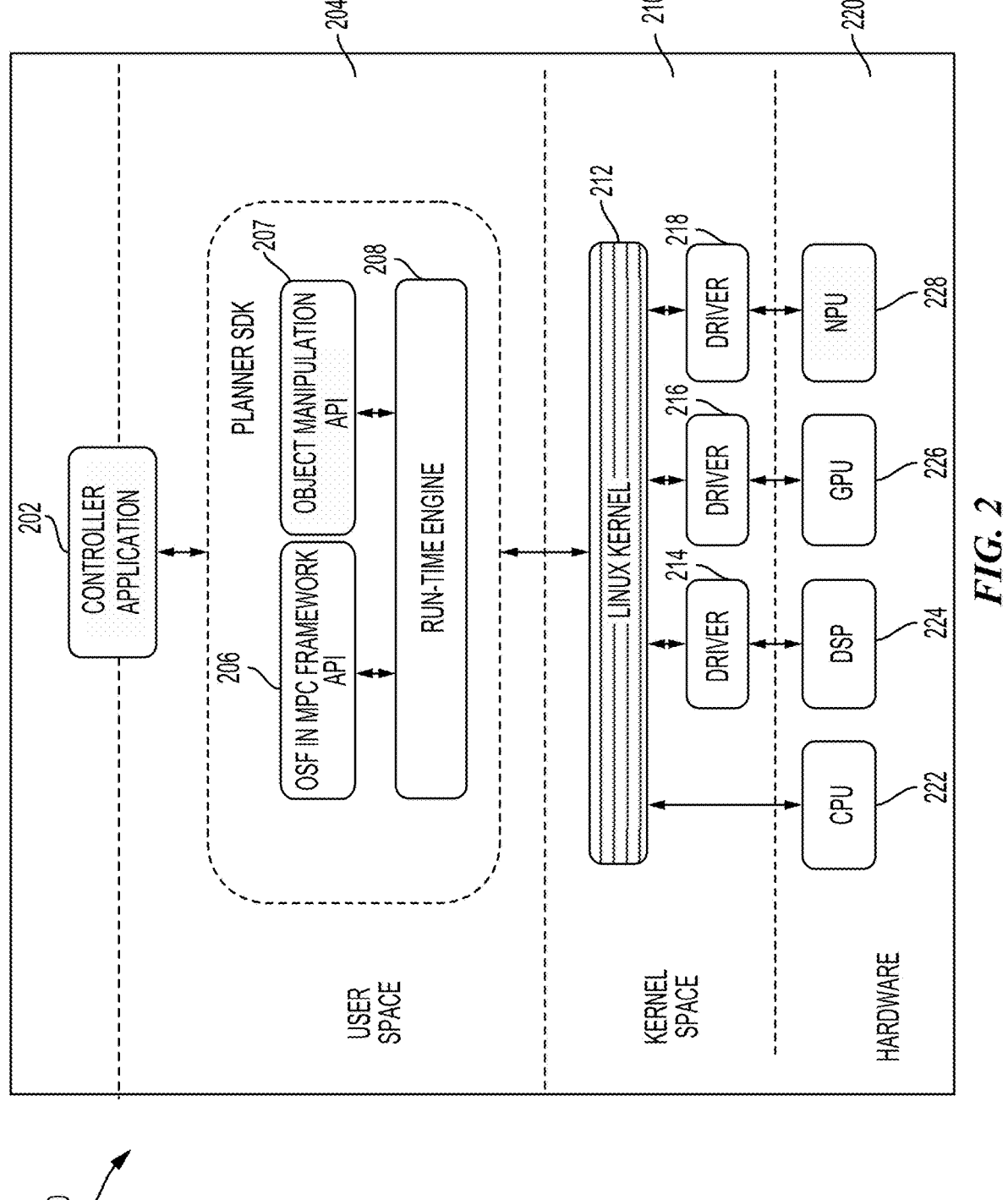
FIG. 2 is a block diagram illustrating a software architecture that may modularize functions for 3D object representation using object-centric neural implicit scattering functions (OSF) in a model-predictive control (MPC) framework, according to aspects of the present disclosure.

FIG. 2 is a block diagram illustrating a software architecture 200 for 3D object representation using object-centric neural implicit scattering functions (OSF) in a model-predictive control (MPC) framework, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, dynamic model and manipulate multi-object scenes. Various aspects of the present disclosure utilize object-centric neural implicit scattering functions (OSFs) for explicitly modeling light transport and learning to approximate the cumulative radiance transfer, which allows relighting and inverse estimation of scenes involving multiple objects and the change of lights. This proposed method for dynamic modeling and manipulation of multi-object scenes exhibits successful manipulation of simulated multi-object scenes involving extreme lighting directions.

In various aspects of the present disclosure, the controller application 202 may make a request to compile program code associated with a library defined in an OSF in a model predictive control (MPC) framework application programming interface (API) 206 to use OSFs as object representations in an MPC framework for multi-object scenes. The OSF in MPC framework API 206 may model a per-object light transport to enable compositional scene re-rendering under object rearrangement and varying lighting conditions. Additionally, an object manipulation API 207 may manipulate an unknown object perceived in a multi-object scene according to application of an inverse parameter estimation and a graph-based neural dynamics model to estimate initial object poses and a light position in the multi-object scene by performing model predictive control.

A run-time engine 208, which may be compiled code of a run-time framework, may be further accessible to the controller application 202. The controller application 202 may cause the run-time engine 208, for example, to perform object manipulation involving extreme lighting directions. When an object is detected within a predetermined distance of the robot, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
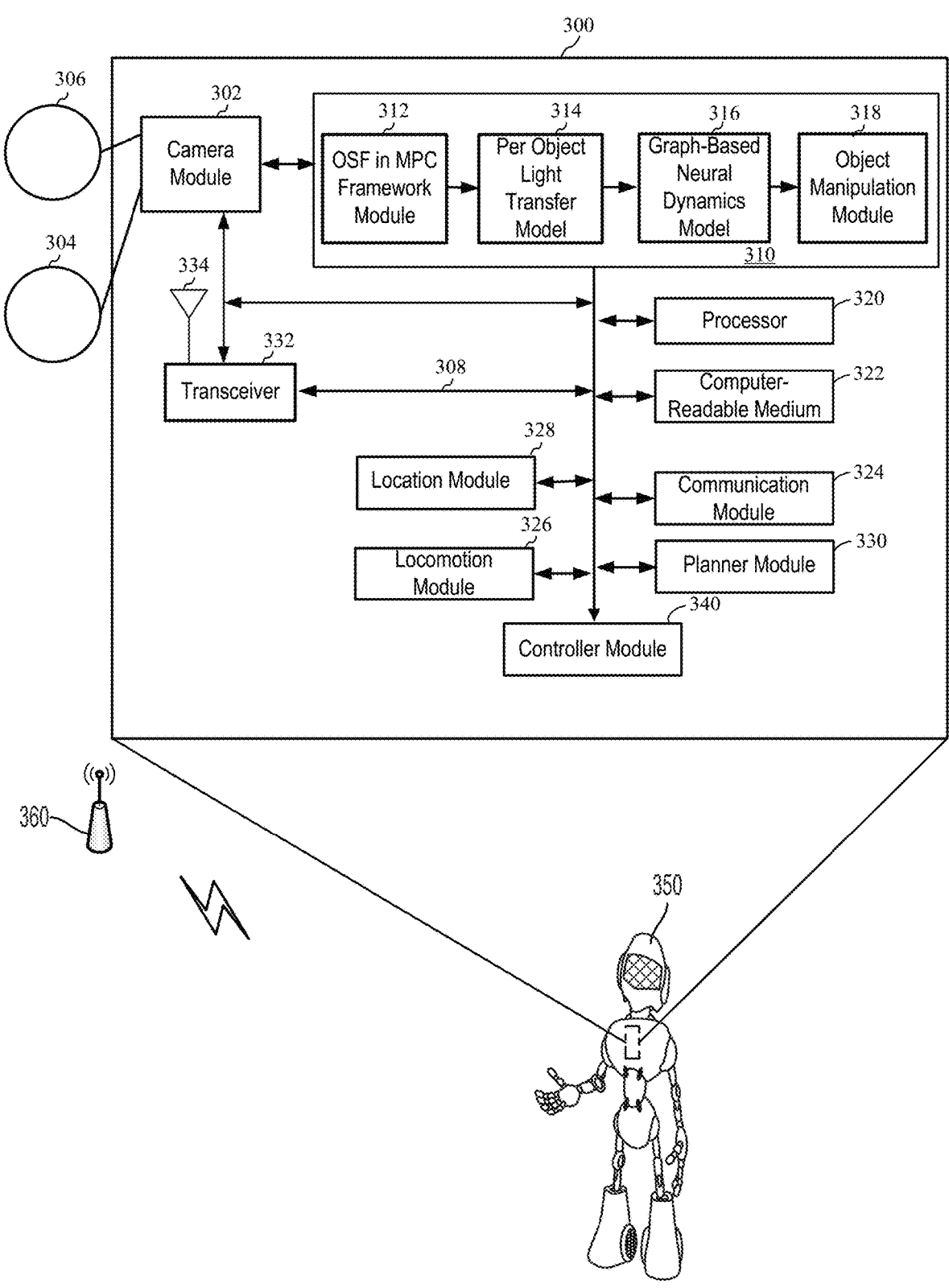
FIG. 3 is a diagram illustrating an example of a hardware implementation for a 3D object manipulation system for 3D object representation using object-centric neural implicit scattering functions (OSF) in a model-predictive control (MPC) framework system, according to various aspects of the present disclosure.

FIG. 3 is a diagram illustrating an example of a hardware implementation for a 3D object manipulation system 300 for 3D object representation using object-centric neural implicit scattering functions (OSF) in a model-predictive control (MPC) framework, according to various aspects of the present disclosure. The 3D object manipulation system 300 may be configured for understanding a scene to enable planning and controlling a robot in response to images from video captured through a camera during operation of a robot 350. The 3D object manipulation system 300 may be a component of a robotic or other autonomous device. For example, as shown in FIG. 3, the 3D object manipulation system 300 is a component of the robot 350. Aspects of the present disclosure are not limited to the 3D object manipulation system 300 being a component of the robot 350, as other devices, such as a vehicle, a bus, a motorcycle, or other like autonomous vehicles, are also contemplated for using the 3D object manipulation system 300. The robot 350 may be autonomous or semi-autonomous.

The 3D object manipulation system 300 may be implemented with an interconnected architecture, such as a controller area network (CAN) bus, represented by an interconnect 308. The interconnect 308 may include any number of point-to-point interconnects, buses, and/or bridges depending on the specific application of the 3D object manipulation system 300 and the overall design constraints of the robot 350. The interconnect 308 links together various circuits, including one or more processors and/or hardware modules, represented by a camera module 302, a robot perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The 3D object manipulation system 300 includes a transceiver 332 coupled to the camera module 302, the robot perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the robot 350. As another example, the transceiver 332 may transmit auto-labeled 3D objects within a video and/or planned actions from the robot perception module 310 to a server (not shown).

The 3D object manipulation system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the 3D object manipulation system 300 to perform the various functions described for robotic perception of objects in multi-object scenes in video captured by a camera of an autonomous agent, such as the robot 350, or any of the modules (e.g., 302, 310, 324, 326, 328, 330, and/or 340). The computer-readable medium 322 may also be used for storing data that is manipulated by the processor 320 when executing the software.

The camera module 302 may obtain images via different cameras, such as a first camera 304 and a second camera 306. The first camera 304 and the second camera 306 may be a vision sensors (e.g., a stereoscopic camera or a red-green-blue (RGB) camera) for capturing 2D RGB images. Alternatively, the camera module may be coupled to a ranging sensor, such as a light detection and ranging (LI-DAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first camera 304 or the second camera 306.

The images of the first camera 304 and/or the second camera 306 may be processed by the processor 320, the camera module 302, the robot perception module 310, the communication module 324, the locomotion module 326, the location module 328, and the controller module 340. In conjunction with the computer-readable medium 322, the images from the first camera 304 and/or the second camera 306 are processed to implement the functionality described herein. In one configuration, detected 3D object information captured by the first camera 304 and/or the second camera 306 may be transmitted via the transceiver 332. The first camera 304 and the second camera 306 may be coupled to the robot 350 or may be in communication with the robot 350.

Learning visual dynamics models of the environment has been shown to be effective in downstream robotic manipulation tasks, such as the robot 350. Yet, it remains unclear how best to represent scenes involving multi-object interactions. One idea is to decompose a scene into discrete objects; however, existing methods leverage object representations that only encode an object's appearance under specific conditions, which struggle with precise modeling and manipulation of compositional scenes in the face of extreme lighting conditions. Various aspects of the present disclosure are directed to using object-centric neural implicit scattering functions as object representations in an MPC framework. These representations, which model per-object light transport, enable compositional scene re-rendering under object rearrangement and varying lighting conditions. These aspects of the present disclosure, when combined with inverse parameter estimation and graph-based neural dynamics models, perform model-predictive control for robotic manipulation by the robot 350 in compositional multi-object environments, such as previously unseen scenarios and harsh lighting conditions.

The location module 328 may determine a location of the robot 350. For example, the location module 328 may use a global positioning system (GPS) to determine the location of the robot 350. The location module 328 may implement a dedicated short-range communication (DSRC)-compliant GPS unit. A DSRC-compliant GPS unit includes hardware and software to make the robot 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the robot 350 with space-level accuracy for accurately directing the robot 350 to a desired location. For example, the robot 350 is moving to a predetermined location and desires partial sensor data. Space-level accuracy means the location of the robot 350 is described by the GPS data sufficient to confirm a location of the robot 350 parking space. That is, the location of the robot 350 is accurately determined with space-level accuracy based on the GPS data from the robot 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the robot 350 that are not modules of the 3D object manipulation system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The 3D object manipulation system 300 also includes the planner module 330 for planning a selected trajectory to perform a route/action (e.g., collision avoidance) of the robot 350 and the controller module 340 to control the locomotion of the robot 350. The controller module 340 may perform the selected action via the locomotion module 326 for autonomous operation of the robot 350 along, for example, a selected route. In one configuration, the planner module 330 and the controller module 340 may collectively override a user input when the user input is expected (e.g., predicted) to cause a collision according to an autonomous level of the robot 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous agents (e.g., Level 0, Level 1, Level 2, Level 3, Level 4, and Level 5). For example, if an autonomous agent has a higher-level number than another autonomous agent (e.g., Level 3 is a higher-level number than Levels 2 or 1), then the autonomous agent with a higher-level number offers a greater combination and quantity of autonomous features relative to the agent with the lower-level number. These various levels of autonomous agents are described briefly below.

Level 0: In a Level 0 agent, the set of advanced driver assistance system (ADAS) features installed in an agent provide no agent control but may issue warnings to the driver of the agent. An agent which is Level 0 is not an autonomous or semi-autonomous agent.

Level 1: In a Level 1 agent, the driver is ready to take operation control of the autonomous agent at any time. The set of ADAS features installed in the autonomous agent may provide autonomous features such as: adaptive cruise control (ACC); parking assistance with automated steering; and lane keeping assistance (LKA) type II, in any combination.

Level 2: In a Level 2 agent, the driver is obliged to detect objects and events in the roadway environment and respond if the set of ADAS features installed in the autonomous agent fail to respond properly (based on the driver's subjective judgement). The set of ADAS features installed in the autonomous agent may include accelerating, braking, and steering. In a Level 2 agent, the set of ADAS features installed in the autonomous agent can deactivate immediately upon takeover by the driver.

Level 3: In a Level 3 ADAS agent, within known, limited environments (such as freeways), the driver can safely turn their attention away from operation tasks but must still be prepared to take control of the autonomous agent when needed.

Level 4: In a Level 4 agent, the set of ADAS features installed in the autonomous agent can control the autonomous agent in all but a few environments, such as severe weather. The driver of the Level 4 agent enables the automated system (which is comprised of the set of ADAS features installed in the agent) only when it is safe to do so. When the automated Level 4 agent is enabled, driver attention is not required for the autonomous agent to operate safely and consistent within accepted norms.

Level 5: In a Level 5 agent, other than setting the destination and starting the system, no human intervention is involved. The automated system can drive to any location where it is legal to drive and make its own decision (which may vary based on the district where the agent is located).

A highly autonomous agent (HAA) is an autonomous agent that is Level 3 or higher. Accordingly, in some configurations the robot 350 is one of the following: a Level 0 non-autonomous agent; a Level 1 autonomous agent; a Level 2 autonomous agent; a Level 3 autonomous agent; a Level 4 autonomous agent; a Level 5 autonomous agent; and an HAA.

The robot perception module 310 may be in communication with the camera module 302, the processor 320, the computer-readable medium 322, the communication module 324, the locomotion module 326, the location module 328, the planner module 330, the transceiver 332, and the controller module 340. In one configuration, the robot perception module 310 receives sensor data from the camera module 302. The camera module 302 may receive RGB video image data from the first camera 304 and the second camera 306. According to aspects of the present disclosure, the robot perception module 310 may receive RGB video image data directly from the first camera 304 or the second camera 306 to manipulate unknown objects from images captured by the first camera 304 and the second camera 306 of the robot 350.

As shown in FIG. 3, the robot perception module 310 includes an OSF in MPC framework module 312, a per object light transfer model 314, a graph-based neural dynamics model 316, and an object manipulation module 318. The OSF in MPC framework module 312, the per object light transfer model 314, the graph-based neural dynamics model 316, and the object manipulation module 318 may be components of a same or different artificial neural network, such as a convolutional neural network (CNN). The modules (e.g., 312, 314, 316, 318) of the robot perception module 310 are not limited to a convolutional neural network. In operation, the robot perception module 310 receives a video stream from the first camera 304 and the second camera 306. The video stream may include a 2D RGB left image from the first camera 304 and a 2D RGB right image from the second camera 306 to provide video frame images. The video stream may include multiple frames, such as image frames.

In some aspects of the present disclosure, the robot perception module 310 is configured to use object-centric neural implicit scattering functions (OSFs) as object representations in a model-predictive control (MSC) framework using the OSF in MPC framework module 312. Using these representations, the per object light transfer model 314 is trained to model per-object light transport, which enables compositional scene re-rendering under object rearrangement and varying lighting conditions. These aspects of the present disclosure, when combined with inverse parameter estimation and the graph-based neural dynamics model 316, perform model-predictive control for robotic manipulation by the robot 350 using the object manipulation module 318 in compositional multi-object environments, such as previously unseen scenarios and harsh lighting conditions, for example, as shown in FIG. 4.

Figure 4:
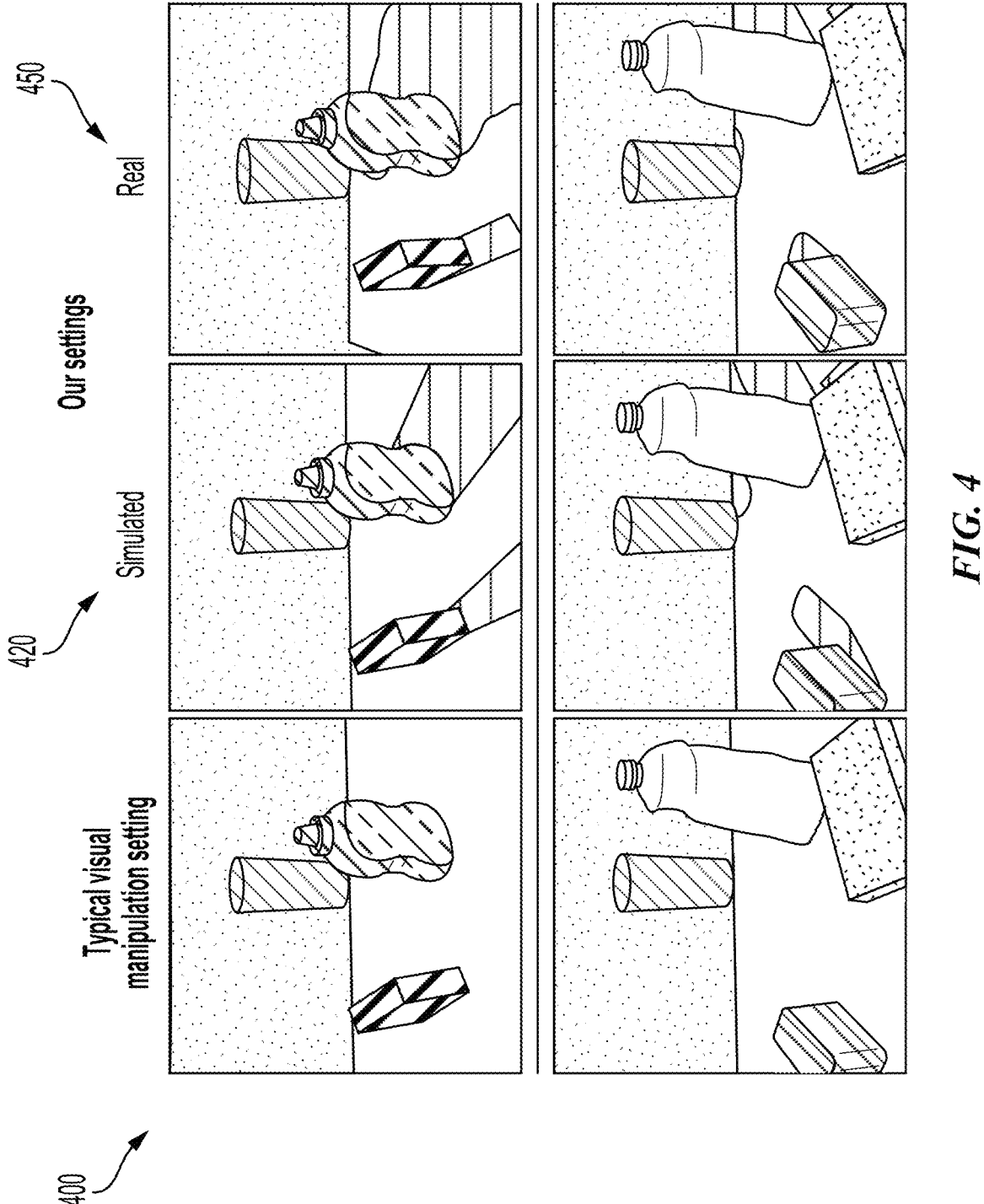
FIG. 4 is a drawing illustrating objects in varying lighting conditions between a typical visual manipulation setting and harsh lighting conditions according to various aspects of the present disclosure.

FIG. 4 is a drawing illustrating objects in varying lighting conditions between a typical visual manipulation setting 400 and lighting conditions 420, according to various aspects of the present disclosure. While typically studied visual manipulation settings are carefully controlled environments, various aspects of the present disclosure consider scenarios with varying and even harsh lighting, in addition to novel object configurations, that are more similar to real-world scenarios 450.

1. Problem Definition

Various aspects of the present disclosure are directed to executing a series of actions to achieve a goal object configuration at the end of a predetermined number of steps. For example, given a set of N known objects with pre-trained object-centric neural scattering functions (OSF) models, a goal image depicting the desired configuration of the objects $I_{goal}$, and RGB camera observations of the scene from V different viewpoints at each timestep t, denoted $I_t^{1:V}$, the objective is to execute a sequence of actions $\alpha_{0:T}$ such that the goal object configuration is achieved at the end of T steps. Each action in the action sequence is defined as a 3D change in position for a cylindrical pusher object that is present in all scenes but could be generalized to represent many types of robot end-effectors. These aspects of the present disclosure assume access to the camera parameters for each observation and the goal image, but not the lighting parameters.

More specifically, multi-view images of each object in varying lighting settings with paired light pose information is sufficient supervision for training OSFs. As a result, access to object meshes is unnecessary. The following descriptions of the various aspects of the present disclosure are constrained to overseeing rigid objects for simplicity.

2. Methods

Various aspects of the present disclosure are directed to solving tabletop visual object manipulation tasks. Various aspects of the present disclosure provide a model for solving tabletop visual object manipulation tasks, have two properties: (1) the scene should have a compact, low-dimensional representation, which allows learned dynamics models to perform more stable long-horizon prediction; and (2) the model should be capable of handling scenarios with different object configurations and previously unseen, unknown lighting.

Various aspects of the present disclosure achieve the first property by selecting to represent scenes using a 6D pose of each object. Then, the second property is achieved by implicitly modeling each object using the object-centric neural scattering functions (OSFs). As described, OSFs model the light transport for a particular object—specifically, given the spatial location and incoming and outgoing light direction, OSFs output the radiance transfer. Importantly, this enables relighting as well as composition during the rendering process.

In some aspects of the present disclosure, a method is composed of three main steps. For example, the first is an offline optimization phase, where a dynamics model is trained using simulated data that takes as input 6D object poses of each object in a scene and a pusher's action, and outputs future 6-D poses for each object. Then, at inference time, an inverse parameter estimation with OSF models is used to estimate the scene's initial object poses and the light position. Finally, the learned dynamics model is used to perform model-predictive control by updating object states at each step using the same inverse parameter estimation strategy. Each component of the proposed method is introduced in the following sections, with a summary presented in Algorithm 1.

2.1 Neural Implicit Scattering Functions

In some aspects of the present disclosure, a rendering process is inverted to determine the poses of objects in visual observations, which are used to represent the scene. Because an estimation approach is desired to generalize any combination of objects, an object-centric, composable implicit model is selected. Specifically, object-centric neural scattering functions (OSFs) are used to represent each object.

As described, OSFs are relightable, compositional implicit neural rendering models based on neural radiance fields (NeRFs). To achieve relighting, OSFs learn to approximate the cumulative radiance transfer from a distant light in addition to learning the spatial volume density as NeRFs do:

$$\rho(X, \omega_{light}, \omega_{out}), \sigma(X) = f_\theta(X, \omega_{light}, \omega_{out}), \tag{1}$$

where x denotes the 3D spatial location, $\sigma$ denotes the spatial volumetric density, $\omega_{out}$ denotes the outgoing radiation direction, $\omega_{light}$ denotes the distant light direction, and $f_\theta$ denotes a learnable deep neural network. $\rho(x, \omega_{light}, \omega_{out})$ denotes the cumulative radiance transfer function. The scattered outgoing radiance $L_{out}$ can then be formulated as $$L_{out}(X, \omega_{out}) = \int_{S^2} \rho(X, \omega_{light}, \omega_{out}) L_{light} \omega_{light} \, d\omega_{out}, \tag{2}$$

where $L_{light}$ denotes the radiance of the distant light.

To accelerate the rendering of OSFs, a variant called KiloOSF is used and extends the idea of KiloNeRF, which represents a static scene as thousands of small independent multilayer perceptrons (MLPs), to the object-centric setting.

To achieve compositional rendering with KiloOSF, a ray transformation $r_c(t)^\dagger = \text{trans}(r(t), c_{pose})$ is used to render the outgoing rays of the object c in pose $c_{pose}$:

$$L(r) = \sum_c \int_{t_n}^{t_f} T(t)\sigma(r_c(t)^\dagger) L_{out}(r_c(t)^\dagger, \omega_{out}) dt, \tag{3}$$

where T(t) denotes the accumulated transmittance along the ray from the near plane $t_n$ to the far plane $t_f$. For fast inference speed, shadows are rendered using shadow mapping.

2.2. Inverse Parameter Estimation

To increase the stability of long-term dynamics predictions, coordinate space pose vectors (rather than latent vectors) are used to represent objects compactly. Access to RGB images of the initial scene $I_i \in \mathbb{R}^{H \times W \times 3}$ is assumed, where i=1, . . . , V represents the index into V camera views, as well as binary masks $M_j^i \in \{0,1\}^{H \times W}$ of each object j in view of i. Access to KiloOSF models $O_j$, j=1, . . . , n for each object in the scene is also assumed. In particular, the KiloOSF model is referred to for the compositional rendering of multiple objects (including shadows) as $O_{1:n}^{all}$. For the rest of this section, the notation $O_j(v,s,L)$ is used to indicate rendering object j with pose s from viewpoint v with directional light pose L.

Additionally, a covariance matrix adaptation (CMA), represented by $\Psi$, is used to optimize the 6D poses of each of n objects $s_{1:n} \in \mathbb{R}^{n \times 7}$ and light position $L^P \in \mathbb{R}^3$:

$$s_{1:n}, L^p = \Psi\left(I_{1:V}, M_{1:n}^{1:V}, O_{1:n}\right), \tag{4}$$

as shown in FIG. 5.

Figure 5:
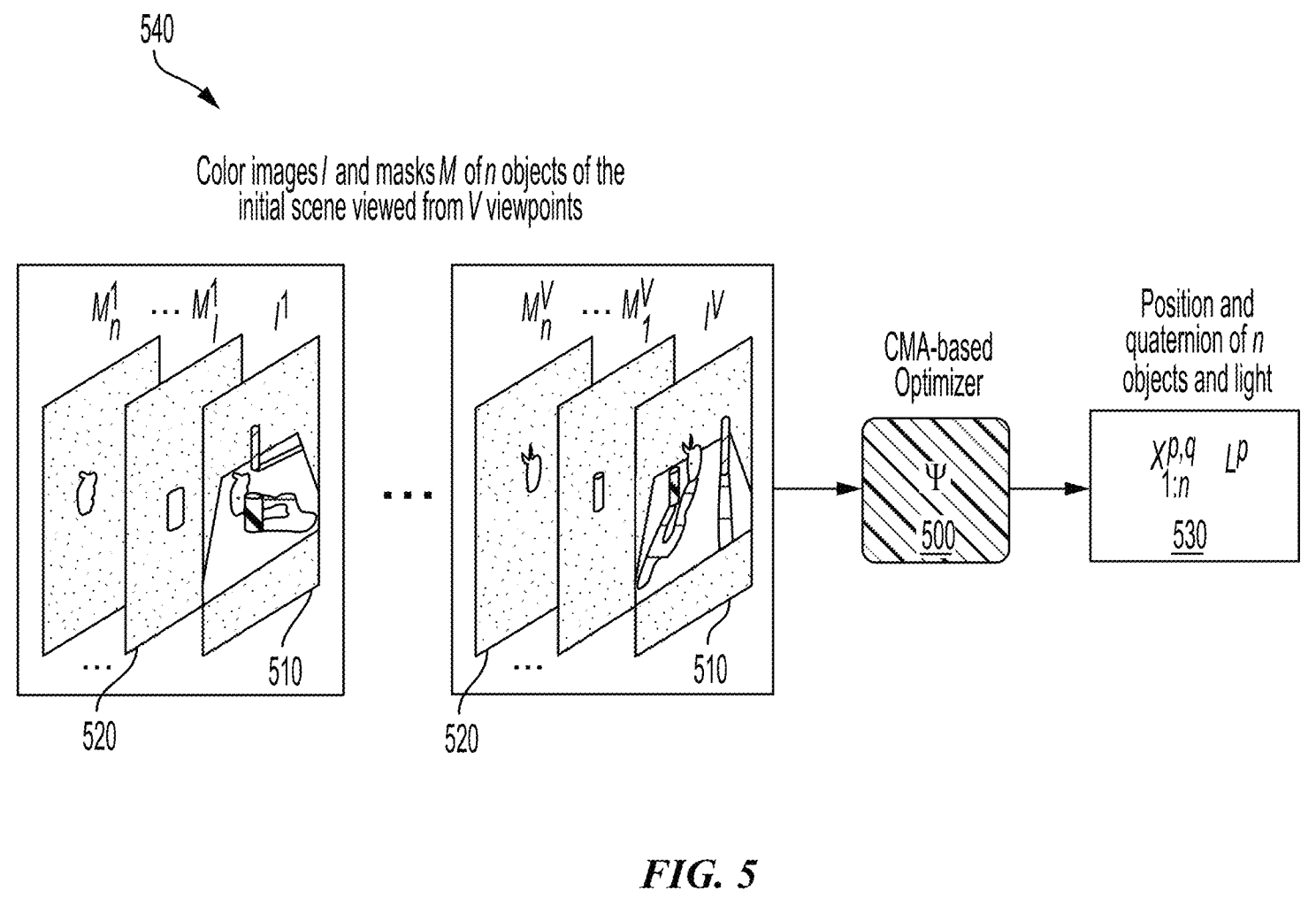

FIG. 5 is a block diagram of a covariance matrix adaptation (CMA) optimizer 540 for pose estimation of various objects and light, according to aspects of the present disclosure. Given multi-view images (I) 510 of an initial static scene and binary masks 520 of each object, a CMA-based optimizer 500 is used to estimate an initial 6D pose (position and quaternion) 530 of each object and the 3D position of the light source. In contrast to previous methods, various aspects of the present disclosure explicitly model lighting conditions to better recover poses in novel lighting directions, for example, as shown in FIG. 4.

For object pose optimization, some aspects of the present disclosure use a mean-squared error (MSE) of V multi-view KiloOSF-rendered images of the object and the observed multi-view images $I_{1:V}$ 510, masked by the binary masks 520 for each object $M_j^{1:V}$. These aspects of the present disclosure initialize the light direction $L_{init}$ as the unit vector in the z-direction. Specifically, $$\mathcal{L}_j^{object} = \sum_{v \in V} \left\| O_j(v, s_j, L_{init}) - \left(I_v \circ M_j^v\right) \right\|_2^2. \tag{5}$$

For light pose optimization, the entire scene is compositionally rendered, including shadows, with KiloOSF $O_{1:n}^{all}$ and compute the MSE with the observed images:

$$\mathcal{L}^{light} = \sum_{v \in V} \left\| (O_{1:n}^{all}(v, s_{1:n}, L^p), -I_v \right\|_2^2. \tag{6}$$

Figure 6:
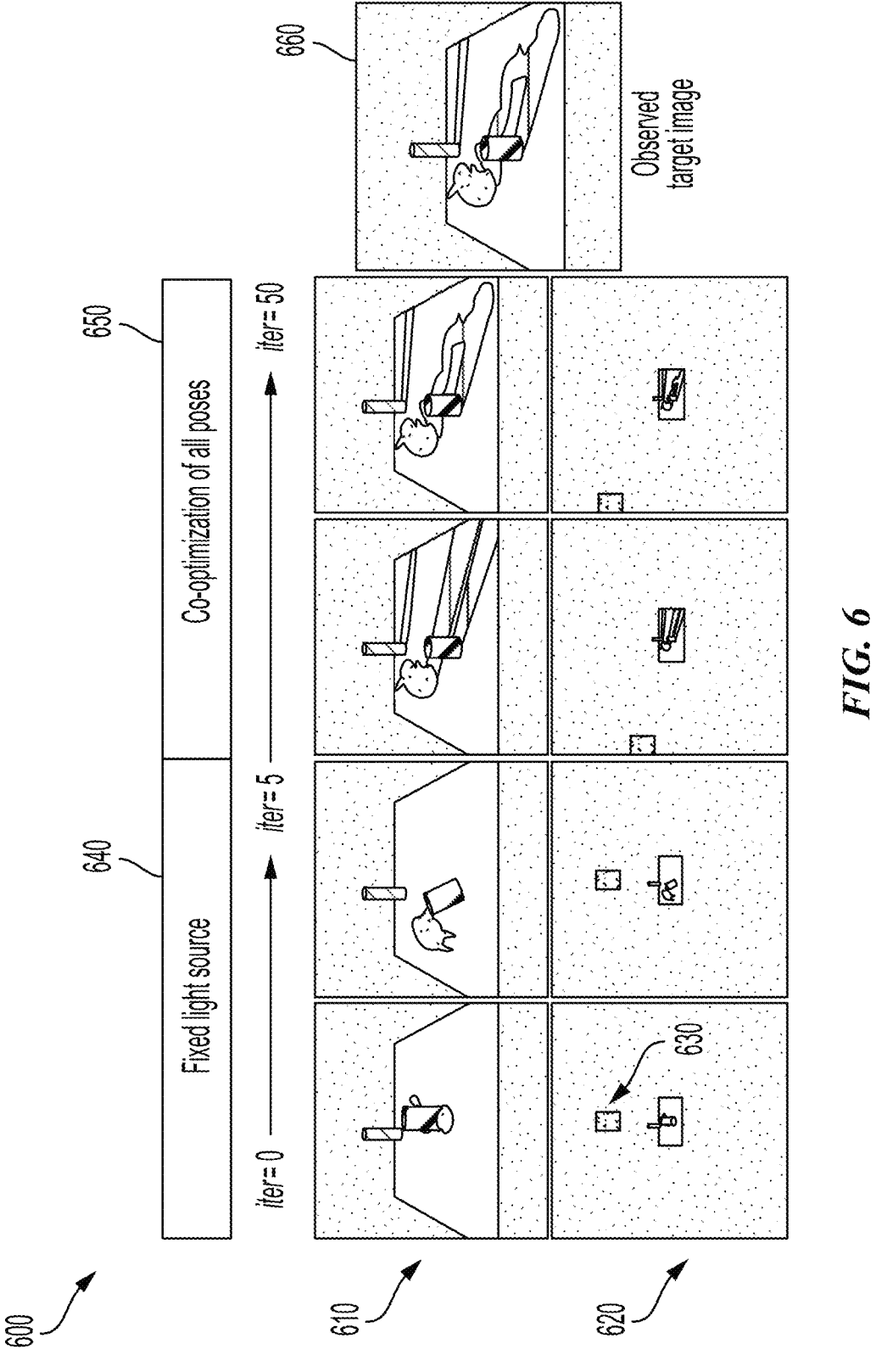
FIG. 6 is a drawing illustrating a demonstration of inverse parameter estimation, according to various aspects of the present disclosure.

FIG. 6 shows a visualization process.

FIG. 6 is a drawing illustrating a demonstration of inverse parameter estimation, according to various aspects of the present disclosure. In an inverse parameterization process 600 of FIG. 6, a top row 610 and a bottom row 620 show the same tabletop setting from close and far views, respectively. A cube 630 represents the light position, which points at the plane's center. In the first five iterations 640, the light pose is fixed directly overhead and optimizes all object poses during co-optimization of all poses in the next iterations 650. When object poses are optimized, all object poses, and the light pose are estimated together to provide an observed target image 660.

2.3. Action-Conditioned Dynamics Model

Figure 7:
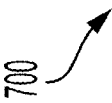
FIG. 7 is a block diagram illustrating a structure of a graph neural network (GNN) dynamics model, according to various aspects of the present disclosure.

FIG. 7 is a block diagram illustrating a structure of a graph neural network (GNN) dynamics model, according to various aspects of the present disclosure. Within a time, step, propagators are looped over multiple times to address multi-step force transfer when more than two objects interact. During dynamics prediction, subsequent states are inferred given object poses and an action taken by an agent in the scene. Various aspects of the present disclosure train a GNN dynamics model 700 to make predictions of the future object 6-D poses:

$$s_{1:n}^{t+1} = f_{GNN}\left(s_{1:n}^{t}, A^{t}, \alpha^{t}\right) \in \mathbb{R}^{n \times 7}, \tag{7}$$

where $A^{t} \in \{0,1\}^{n,n}$ is the adjacency matrix, $\alpha^{t} \in \mathbb{R}^{3}$ is the input action, and $s_{1:n}^{t} \in \mathbb{R}^{n \times 7}$ are poses of all objects at time t. To model multi-object interactions, multiple inter-object propagation steps are performed during the prediction for a single future time step. As shown in FIG. 7, a node encoder 710 receives the input actions $\alpha^{t}$ and poses $s_{1:n}^{t}$, and an edge encoder 720 receives the adjacency matrix $A^{t}$. Additionally, a node propagator 730 is coupled to the output of the node encoder 710, and an edge propagator 740 is coupled to the output of the edge encoder 720, which are both coupled to a node decoder 750.

In this example, each node in a graph is used to represent a single object, where each input node feature is its pose $s_{i}^{t}$. In this example, edges in the GNN dynamics model 700 are dynamically created to improve the stability of long-term predictions. For example, edges are constructed between graph nodes if the objects represented by those nodes can potentially interact (collide) during the current timestep. This example represents edge information using an adjacency matrix $A^{t}$. Because this example works in coordinate space, an approximated distance between two objects is used to decide whether there is a potential collision. This potential collision decision leverages the geometric information present in the density fields of the KiloOSF models. These aspects of present disclosure first construct approximate point clouds by using the KiloOSF to evaluate the density of a grid of points and selecting points above a certain density threshold. Then, the longest axis of the bounding box containing points is used as the threshold distance K for edge creation. Note that the creation of an edge does not mean that the model necessarily will predict a collision, but rather that it can.

$$A_{ij}^{t} = \begin{cases} 1 & \left\| s_{i}^{t} - s_{j}^{t} \right\|_{2}^{2} < \kappa, \, i \neq j \\ 0 & \text{else} \end{cases} \tag{8}$$

As shown in FIG. 7, the GNN dynamics model 700 uses a shared edge encoder $\mathbb{E}^{edge}$ and propagator $\mathbb{P}^{edge}$ regardless of which objects are present in the scene. This enhances the generalization ability of the GNN dynamics model 700 to handle unseen scenarios while using more training data. As shown in FIG. 7, the GNN dynamics model 700, within a time step, loops over propagators multiple times to address multi-step force transfer when more than two objects interact.

In some aspects of the present disclosure the GNN dynamics model 700 is trained using a mean squared-error loss between the predicted and ground truth object poses, each represented by a position $p \in \mathbb{R}^{3}$ and unit quaternion $q \in \mathbb{R}^{4}$, summed across all objects in the scene. Dynamics models trained on single-step prediction are prone to compounding errors during longer open-loop model rollouts. Thus, aspects of the present disclosure train the model on predictions of up to three (3) future timesteps.

2.4. Visual Model-Predictive Control

Figure 8:
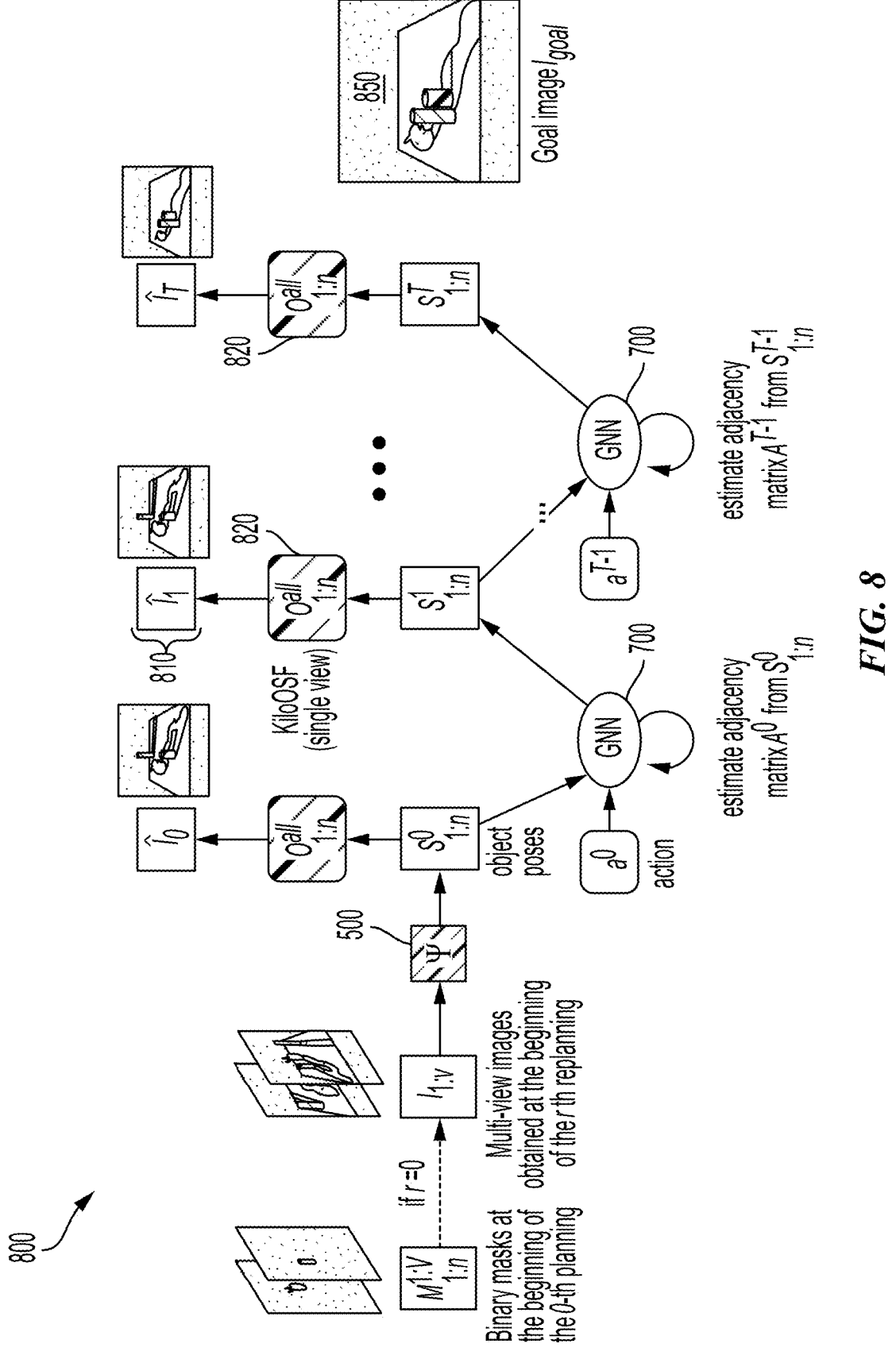
FIG. 8 is a block diagram illustrating a visual model-predictive control (MPC) framework for perception through inverse parameter estimation using the CMA-based optimizer of FIG. 5 and prediction using the GNN dynamics model of FIG. 7, according to various aspects of the present disclosure.

FIG. 8 is a block diagram illustrating a visual model-predictive control (MPC) framework 800 for perception through inverse parameter estimation using the CMA-based optimizer 500 of FIG. 5 and prediction using the GNN dynamics model 700 of FIG. 7, according to various aspects of the present disclosure. FIG. 8 shows the r-th replanning step in model-predictive control. In the first step, the multi-view images $I_{1:V}$ and the object's binary masks $M_{1:n}^{1:V}$ are used for inverse parameter estimation through the CMA-based optimizer 500. Afterward, only multi-view images are used. Additionally, the predicted images $\hat{I}^{t:t+H}$ 810 are rendered using KiloOSF 820 with the goal image view, and then the sequence of predicted images $\hat{I}^{t:t+H}$ 810 are compared with the goal image $I_{goal}$ 850 via a mean-squared error (MSE) loss.

Given the goal image 850 and initial visual observations of an environment, the objective of the visual MPC framework 800 is to optimize a robot action sequence to reach the goal image 850, according to various aspects of the present disclosure.

After estimating the light position and each object's initial pose, sampling-based planning is performed using the leaned, GNN dynamics model 700. At timestep t, M action sequences of length H are first sampled. By rolling out open-loop predictions from the GNN dynamics model 700, the predicted future poses of each object $\hat{s}_{1:n}^{t:t+H}$ are obtained for each sample. Next, these objects and light poses are provided to the KiloOSF 820 to render the predicted images $\hat{I}^{t:t+H}$ 810. Some aspects of the present disclosure use the squared $\ell_{2}$ error between the rendered predicted images $\hat{I}^{t:t+H}$ 810 and the goal image 850, that is, $\Sigma_{\tau=t}^{t+H} \|\hat{I}^{\tau} - I_{goal}\|_{2}^{2}$ as the cost function to score each action sequence sample. Next, a model predictive path integral (MPPI) is used to update the action sampling distribution based on the action samples and the scores. The first step of the best action sequence is taken in the environment.

Then, the object pose estimates $s_{1:n}^{t+1}$ are updated again using inverse parameter estimation using the new observations taken from the environment $I_{1:V}$. To reduce the computational cost, the search space for inverse parameter estimation is decreased at this step by significantly reducing the initial standard deviation of the CMA-based optimizer 500 compared to the initial parameter estimation step.

The process is repeated to replan at the next time step. Algorithm 1 outlines the entire planning procedure.

---

| Algorithm 1 Visual MPC with OSFs and GNN dynamics |
|---|

Input: Pre-trained KiloOSF models $O_{1:n}(O_{1:n}^{all})$, initial environment image observation $I_{1:V}$, initial object masks $M_{1:n}^{1:V}$, goal image $I_{goal}$ and viewpoint $v_{goal}$, graph neural network dynamics model $f_{GNN}$, planning horizon H 1:    for t = 0 ... T do
2:       if t = 0 then
3:          // Perform initial object & light pose estimation
4:          $s_{1:n}^{0}, L^{P} = \Psi(I_{1:V}, M_{1:n}^{1:V}, O_{1:n})$
5:       else
6:          // Refine object pose estimates
7:          $s_{1:n}^{t} = \Psi(I_{1:V}, O_{1:n}^{all})$
8:       end if
9:       Sample M action sequences $\alpha_{M}^{t:t+H}$.
10:      // Iteratively predict H future states with the action conditioned GNN dynamics model.
11:      $\hat{s}_{1:n}^{t:t+H} = f_{GNN}(s_{1:n}^{t}, \alpha^{t:t+H})$.
12:      // Use KiloOSF to render image predictions from the goal image viewpoint.
13:      $\hat{I}^{t:t+H} = O_{1:n}^{all}(v_{goal}, \hat{s}_{1:n}^{t:t+H}, L^{P})$.
14:      // Compute loss for each sampled action sequence.
15:      $L = \Sigma_{\tau=t}^{t+H} \|\hat{I}^{\tau} - I_{goal}\|_{2}^{2}$.

-continued

| Algorithm 1 Visual MPC with OSFs and GNN dynamics | |
| --- | --- |
| 16: | Update action sampling distribution with MPPI |
| 17: | Execute the first step of the best action sequence found. |
| 18: | Receive a unique environment observation $I_{1:p}$. |
| 19: | end for |

A process for operation of the visual MPC framework 800 is further illustrated in FIG. 9.

FIG. 9 is a flowchart illustrating a method for dynamic modeling and manipulation of multi-object scenes, according to aspects of the present disclosure. A method 900 begins at block 902, in which object-centric neural implicit scattering functions (OSFs) are used as object representations in a model-predictive control (MPC) framework for the multi-object scenes. For example, as shown in FIG. 3, the robot perception module 310 is configured to use object-centric neural implicit scattering functions (OSFs) as object representations in a model-predictive control (MSC) framework using the OSF in MPC framework module 312.

At block 904, a per-object light transport is modeled to enable compositional scene re-rendering under object rearrangement and varying lighting conditions. For example, as shown in FIG. 3, using the representations from the OSF in MPC framework module 312, the per object light transfer model 314 is trained to model per-object light transport, which enables compositional scene re-rendering under object rearrangement and varying lighting conditions.

At block 906, inverse parameter estimation and graph neural network (GNN) dynamics models are applied to estimate initial object poses and a light position in the multi-object scene. For example, as shown in FIG. 7, a GNN dynamics model is shown. In this example, within a time, step, propagators are looped over multiple times to address multi-step force transfer when more than two objects interact. During dynamics prediction, subsequent states are inferred given object poses and an action taken by an agent in the scene. Various aspects of the present disclosure train a GNN dynamics model 700 to make predictions of the future object 6-D poses.

At block 908, an object perceived in the multi-object scene according to the applying of the inverse parameter estimation and the GNN dynamics models is manipulated. For example, as shown in FIG. 3, when combined with inverse parameter estimation and the graph-based neural dynamics model 316, perform model-predictive control for robotic manipulation by the robot 350 using the object manipulation module 318 in compositional multi-object environments, such as previously unseen scenarios and harsh lighting conditions, for example, as shown in FIG. 4.

In some aspects of the present disclosure, the method 900 may be performed by the SOC 100 (FIG. 1) or the software architecture 200 (FIG. 2) of the robot 150 (FIG. 1). That is, each of the elements of method 900 may, for example, but without limitation, be performed by the SOC 100, the software architecture 200, or the processor (e.g., CPU 102) and/or other components included therein of the robot 150.

Various aspects of the present disclosure describe a method that uses object-centric dynamics modeling for robotic manipulation in scenes with unseen object configurations and harsh lighting. These aspects of the present disclosure demonstrated that by leveraging object-centric neural scattering functions, the rendering procedure may be inverted to determine object poses and lighting information. This makes disclosed method adaptable to harsh lighting settings and enables us to combine it with a learned neural network dynamics model for use in model-predictive control on long horizon control tasks. This method achieves better reconstruction in harsh lighting scenarios than previous implicit modeling strategies and improved long horizon prediction and model-predictive control performance compared to video prediction models.

Robot manipulation of unknown objects in unstructured environments is a challenging problem due to the variety of shapes, materials, arrangements, and lighting conditions. Even with large-scale real-world data collection, robust perception, and manipulation of transparent and reflective objects across various lighting conditions remain challenging. Some aspects of the present disclosure address these challenges by providing a method that uses object-centric dynamics modeling for robotic manipulation in scenes with unseen object configurations and harsh lighting. By leveraging object-centric neural scattering functions, the disclosed method can invert the rendering procedure to determine object poses and lighting information according to various aspects of the present disclosure. Additionally, the disclosed method is adaptable to harsh lighting settings and enables combination with a learned neural network dynamics model for use in model-predictive control on long horizon control tasks. Beneficially, the disclosed method achieves better reconstruction in harsh lighting scenarios than previous implicit modeling strategies and improves long horizon prediction and model-predictive control performance compared to convention prediction models.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in numerous ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more PGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for dynamic modeling and manipulation of multi-object scenes, the method comprising:
  using object-centric neural implicit scattering functions (OSFs) as object representations in a model-predictive control (MPC) framework for the multi-object scenes;
  modeling a per-object light transport to enable compositional scene re-rendering under object rearrangement and varying lighting conditions;
  applying inverse parameter estimation and graph neural network (GNN) dynamics models to estimate initial object poses and a light position in the multi-object scene; and manipulating an object perceived in the multi-object scene according to the applying of the inverse parameter estimation and the GNN dynamics models.

2. The method of claim 1, in which the multi-object scene exhibits multi-object interactions in extreme and/or harsh lighting conditions.

3. The method of claim 1, further comprising:
  training a dynamics model using simulated data;
  inputting 6D object poses of each object in the multi-object scene and a pusher's action; and
  outputting future 6D poses for each object in the multi-object scene.

4. The method of claim 3, further comprising:
  estimating the initial object poses in the multi-object scene and the light positions;
  inferring the initial object poses in the multi-object scene and the light positions using the inverse parameter estimation using the OSFs;
  performing model predictive control using the GNN dynamics model; and
  updating object states at each step using the inverse parameter estimation.

5. The method of claim 1, further comprising training the GNN dynamics model using simulated data, including inputting 6D object poses of each object in the scene and a pusher's action, and to output future 6-D poses for each object.

6. The method of claim 1, further comprising using the inverse parameter estimation with OSF models to estimate the initial object poses and the light position at inference time.

7. The method of claim 1, further comprising using a learned, GNN dynamics model to perform model-predictive control while updating object states at each step using the inverse parameter estimation.

8. The method of claim 1, further comprising planning pushing and rearranging of an object by a robot according to predictions from video captured by the robot.

9. A non-transitory computer-readable medium having program code recorded thereon for dynamic modeling and manipulation of multi-object scenes, the program code being executed by a processor and comprising:
  program code to use object-centric neural implicit scattering functions (OSFs) as object representations in a model-predictive control (MPC) framework for the multi-object scenes;
  program code to model a per-object light transport to enable compositional scene re-rendering under object rearrangement and varying lighting conditions;
  program code to apply inverse parameter estimation and graph neural network (GNN) dynamics models to estimate initial object poses and a light position in the multi-object scene; and
  program code to manipulate an object perceived in the multi-object scene according to the applying of the inverse parameter estimation and the GNN dynamics models.

10. The non-transitory computer-readable medium of claim 9, in which the multi-object scene exhibits multi-object interactions in extreme and/or harsh lighting conditions.

11. The non-transitory computer-readable medium of claim 9, further comprising:
  program code to train a dynamics model using simulated data;
  program code to input 6D object poses of each object in the multi-object scene and a pusher's action; and program code to output future 6D poses for each object in the multi-object scene.

12. The non-transitory computer-readable medium of claim 11, further comprising:

program code to estimate the initial object poses in the multi-object scene and the light positions;

program code to infer the initial object poses in the multi-object scene and the light positions using the inverse parameter estimation using the OSFs;

program code to perform model predictive control using the GNN dynamics model; and program code to update object states at each step using the inverse parameter estimation.

13. The non-transitory computer-readable medium of claim 9, further comprising program code to train the GNN dynamics model using simulated data, including inputting 6D object poses of each object in the scene and a pusher's action, and to output future 6-D poses for each object.

14. The non-transitory computer-readable medium of claim 9, further comprising program code to use inverse parameter estimation with OSF models to estimate the initial object poses and the light position at inference time.

15. The non-transitory computer-readable medium of claim 9, further comprising program code to use a learned, GNN dynamics model to perform model-predictive control while updating object states at each step using the inverse parameter estimation.

16. The non-transitory computer-readable medium of claim 9, further comprising planning pushing and rearranging of an object by a robot according to predictions from video captured by the robot.

17. A system for dynamic modeling and manipulation of multi-object scenes, the system comprising:

a framework module to use object-centric neural implicit scattering functions (OSFs) as object representations in a model-predictive control (MPC) framework for the multi-object scenes;

a per object light transfer model to model a per-object light transport to enable compositional scene re-rendering under object rearrangement and varying lighting conditions;

a graph-based neural dynamics model to apply inverse parameter estimation and graph neural network (GNN) dynamics models to estimate initial object poses and a light position in the multi-object scene; and an object manipulation module to manipulate an object perceived in the multi-object scene according to the applying of the inverse parameter estimation and the GNN dynamics models.

18. The system of claim 17, in which the multi-object scene exhibits multi-object interactions in extreme and/or harsh lighting conditions.

19. The system of claim 17, in which the graph-based neural dynamics model is further to use a learned, GNN dynamics model to perform model-predictive control while updating object states at each step using the inverse parameter estimation.

20. The system of claim 17, further comprising a planner module to push and/or rearrange an object by a robot according to predictions from video captured by the robot.

* * * * *